United States Patent Office 3,339,527
Patented Sept. 5, 1967

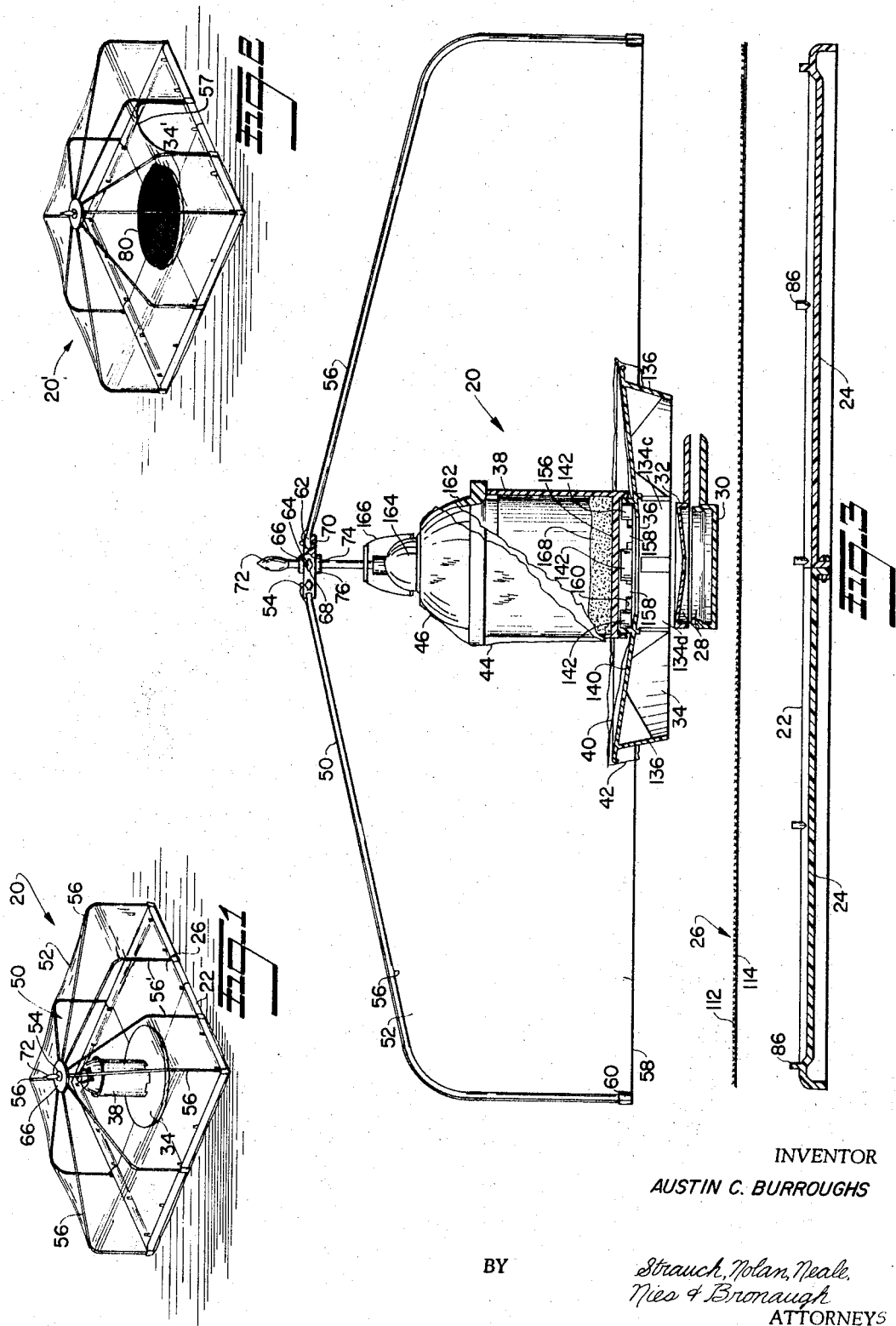

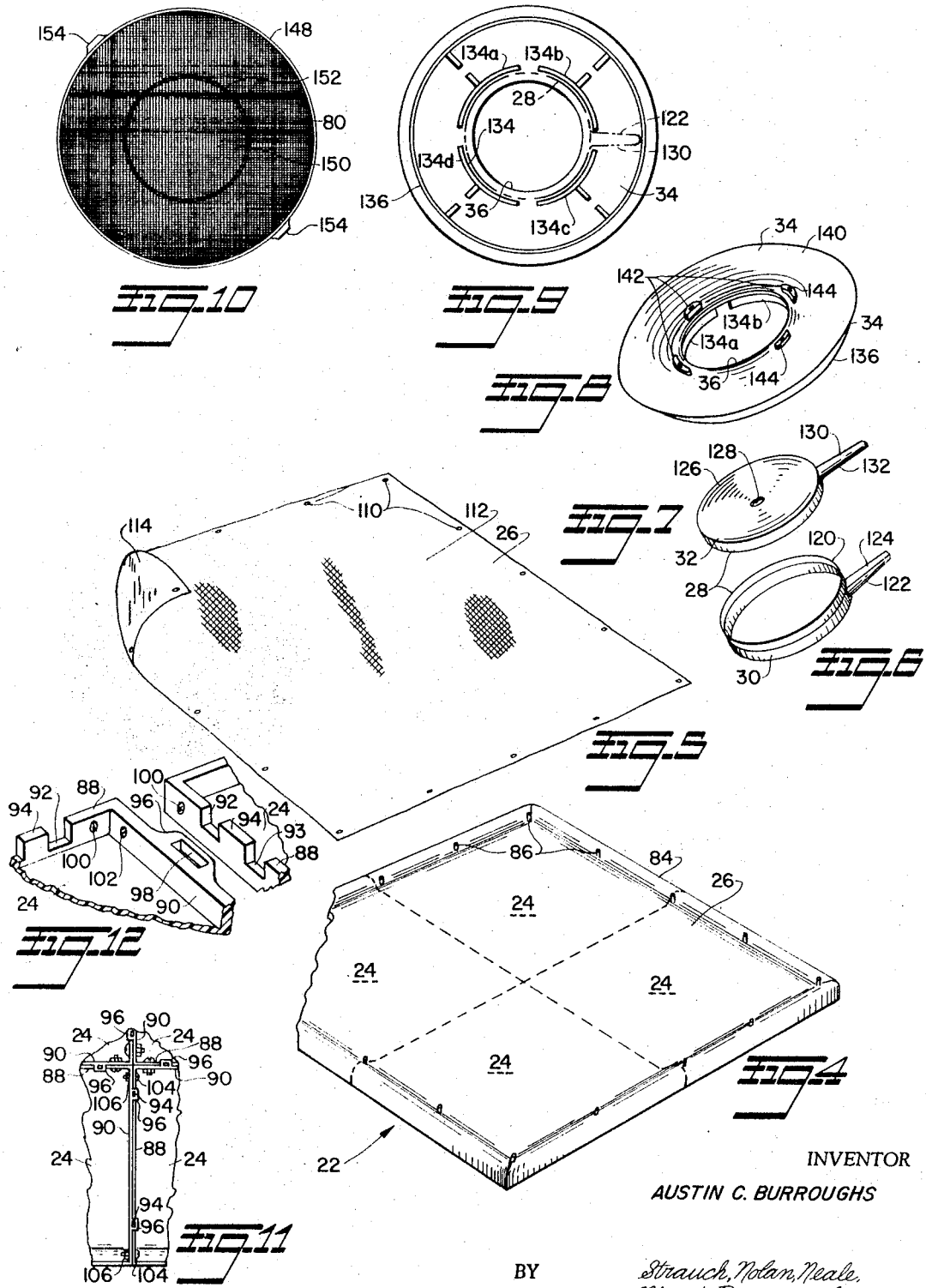

3,339,527
ANIMAL TOILET
Austin C. Burroughs, 6632 Beacon Lane,
Falls Church, Va. 22043
Filed Sept. 2, 1965, Ser. No. 484,534
19 Claims. (Cl. 119—1)

This invention relates to an animal toilet developed particularly for the use of dogs although capable of utilization by other animals with similar habits.

Initial development of this invention was made in order to enable the natural function of dogs, confined in part or wholly to apartments and homes in cities and towns, to be realized in a manner convenient to the dog's owner. It will permit dogs to lead a more natural life because they should be able to relieve themselves when the urge exists. Modern day living conditions with its commensurate enormous increase in population has increased density of living conditions which in turn decreases the opportunity for many dogs living in apartments and many houses to get outside in order to relieve themselves. This unnatural restraint can have harmful effects on the health of the dog. While many house dogs are trained to use newspapers, such a solution is neither satisfactory to the dog nor to its owner.

There are known proposals to cope with the enforced indoor living conditions of animals, but none, insofar as applicant is aware, teaches the invention which he has conceived and developed and hereinafter describes. The prior art teaches use of newspapers by themselves, it teaches use of a wide shallow flat tray with newspaper placed in the tray, it teaches use of a simulated fire plug upon which a male dog can relieve itself, the urine flowing down the post into a large shallow tray type of platform surrounding the base of the post, it proposes a suitcase type of portable animal toilet, animal toilets to be used with a dripping supply of water and in which a sliding drawer collects the combination of water and urine discharge, and other complex devices intended for permanent installation in homes and connected to home plumbing.

None of the prior art discloses the presently proposed combination of a flat base platform with a disposable Pliofilm backed absorbent cover sheet, a hidden urine butler, and a collecting and directing urine collar. No previously known proposal discloses the subcombination of a wide plastic base platform over which is placed a disposable refill unit consisting of a thin multi-ply or laminate sheet material, one side of which is absorbent and the other side of which is impermeable, nor does the prior art disclose other subcombinations of applicant's complete combination invention as will become apparent.

Accordingly, a primary object of this invention resides in the provision of a combination animal toilet unit readily adaptable to accommodate complete relief of either male or female dogs and other animals in a simplified sanitary manner enabling convenience of removal and disposition of the dogs discharges by the owner.

A further object resides in the provision of the novel combination of a large flat base platform, a sheet form disposable refill unit of absorbent material substantially covering the entire base, a butler pan positioned on the base having a small inlet hole in an inverted conically depressed cover, a collecting collar covering, locating and disposed over the butler having a large central opening constituting a liquid directing lip circumscribing the top of the butler pan, and a post device centrally located on the upper side of the collecting collar with provision for drainage through its base to enable fluid flow from the post to the collar and thence to the interior of the butler.

In conjunction with the foregoing object, further objects reside in: (1) Providing a large flat base of inexpensive, substantially rigid plastic material made either of one single piece or fabricated from a plurality of identical module pieces conducive to convenient mass production; (2) the fact that the disposable sheet material refill unit has a non-permeable backing sheet such as Pliofilm with a fibrous absorbent material on its upper surface, the refill unit being foldable into compact flat size susceptible of being sold in small packages of multiple units; (3) making the base module pieces with depending flanged edges serving as support members, providing structural rigidity and enabling maintaining of a level condition of the base in contact with the floor; (4) provision of male and female interlocking portions on side edges of universal module pieces to enable level interlocking of module pieces into a single unit which if desired can be secured in assembly by bolts and nuts; and (5) providing the outer edge of the module piece with a rolled ridge with upstanding short locator pins for cooperation with perforations along the edges of the refill units.

In further conjunction with the foregoing combination, it is a still further object to provide such hollow post member with a removable top, the post having a bottom wall enabling a material such as sand to be placed in the post as added weight to keep the post in position on the urine collecting collar during use; the post top may be provided with a handle for convenience in moving the post for cleaning and, if desired, a diametral handle bar can be fixed on the inside of the post where it is out of reach of animals using the toilet.

A further object resides in the provision of the novel combination of a flat base platform, a urine collecting butler, a urine collecting collar disposed over and covering the butler and a urine collecting post disposed on and spigoted to the urine collecting collar. A novel subcombination of that organization consisting of the butler pan, the collecting collar, and the spigoted post constitutes a further object of the present invention.

A still further object resides in the provision of the novel subcombination of a large flat plastic base together with a specially treated flat sheet refill unit disposed over the flat base member, it being proposed that the refill comprise a thin absorbent sheet with a Pliofilm backing.

A still further object consists in the novel utilization, with any of the foregoing combinations and subcombinations which include the urine collecting collar, of a grill piece to be placed on the urine collecting collar in lieu of the post to enable use by female dogs.

A still further object of this invention resides in the provision of disposable polyethylene film sleeves adapted to fit over the post and of polyethylene film disc units with outer peripheral skirts adapted to fit over the urine collecting collar.

Still another object resides in the provision of a heavy polyethylene film and wire brace "cake cover" unit to be placed over any of the foregoing combinations enabling creation of a pleasant appearance of the devices when used in the home or apartment, the cover being susceptible of ornamentation which could hide its true purpose if desired.

Further novel features and other objects of this invention will become apparent from the following description and claims taken in conjunction with the drawings which show preferred structures and embodiments, in which:

FIGURES 1 and 2 are small perspective views illustrating animal toilets in accord with the present invention, FIGURE 1 including a simulated fire plug post placed on a urine collar and FIGURE 2 showing a female grill placed on a urine collecting collar, the "cake cover" enclosure in each instance being placed over the entire toilet structure;

FIGURE 3 is an enlarged, sectioned elevation view showing the elements of the embodiment of the invention illustrated in FIGURE 1, in an exploded condition, the fire plug post being illustrated partially in elevation and partially in section to show its hollow nature and also the adaptability of a disposable thin polyethylene sleeve placed over the simulated fire plug;

FIGURE 4 is a perspective view, to a smaller scale than FIGURE 3, illustrating an assembled base platform fabricated of four identical module pieces and a sheet material refill unit placed on the base;

FIGURE 5 illustrates a sheet material refill unit substantially the same size as FIGURE 4 showing the edge perforations to fit over the pins shown in FIGURE 4;

FIGURES 6 and 7, respectively, illustrate the base and cover portions of a urine collecting butler pan;

FIGURE 8 is a perspective view of the urine collecting collar drawn to substantially the same scale as FIGURES 6 and 7;

FIGURE 9 is a view looking at the underside of the urine collecting collar shown in FIGURE 8, the urine collecting butler pan being illustrated in phantom lines to show its relative position during use;

FIGURE 10 is a plan view illustrating the wire grid member adapted to be placed over the urine collecting collar when the toilet is to be used by female animals;

FIGURE 11 is a detail view showing a part of the underside of the fabricated flat base seen in FIGURE 4 and illustrates how the module pieces are interlocked by pin and socket arrangements in their base flanges and by nuts and bolts securing the base flanges together; and FIGURE 12 is a substantially enlarged detail view looking at the underneath sides of the modules and illustrating several of the interlocking pins and lugs of the module pieces shown in FIGURE 11.

With general reference to FIGURE 1 and FIGURE 3, an exemplary complete animal toilet 20 includes a base platform member 22, made of four identical module pieces 24 although it could be made of one single piece of material. Placed on top of base member 22 is a disposable refill constituting a sheet of material 26. Placed on the refill sheet will be a urine butler 28 which includes a bottom pan 30 and its cover 32. The butler 28 is located under a urine collar 34 seen in both of FIGURES 1 and 3. Butler 28 and collar 34 are shown as being positioned in the center of the base member, however, their position can be shifted as desired. As described hereinafter in greater detail, urine collected in the tray of the urine collar flows down through its large central opening 36 and onto the butler pan cover 32 thence into the butler pan 30. Suitably located on the upper side of the collar 34 is a upstanding hollow post 38. While this post is primarily intended to enable male dogs to relieve themselves as they do in natural surroundings it is to be clearly understood that the post need not be in the shape of a fire plug as shown, but could simulate a sawed off tree trunk or a smooth lamp post or some other vertical object against which male dogs commonly relieve themselves.

The base member, the butler, the urine collar and the fire plug are preferably made of inexpensive plastic although the base and plug could be made of metal, enamelware or wood specially treated to result in a smooth liquid impermeable surface while the butler pan and collar could be made of metal or enamelware.

Shown in FIGURE 3, an apertured polyethylene disc 40 with a short outer peripheral retaining skirt 42 has been placed on the upper surface of the urine collar 34. There is also a polyethylene sleeve member 44 having an upper portion 46 of reduced diameter (although it could be fully closed at the top) fitting over substantially all of the fire plug 38. Cooperation of the polyethylene disc and sleeve with the other units of the assembly are as auxiliary items which may or may not be used as the owner desires. Such units are proposed to eliminate necessity for frequent cleaning of ether the post or the collecting collar to eliminate the unpleasant ammonia odor of urine. To that end the polyethylene disc 40 and the polyethylene sleeve 44 are to be made of very thin polyethylene sheet or film which can be made in quantities at low cost enabling removal and disposal at daily or greater intervals. The inexpensive film covering protects the surface of both the urine collar and the fire plug post from urine and their frequent disposal prevents undesirable residues of urine from collecting and thereafter emanating odors.

In addition to the polyethylene film disc 40 and sleeve 44, a further auxiliary item is the lightweight removable cover 50 (FIGURES 1, 2 and 3) which can be placed over the toilet 20 and left in place without hindering use by the dog. Such a cover can render the toilet unobtrusive in home or apartment living quarters. The cover 50 is made of a sturdy polyethylene film or the like material and can accommodate various colors and designs, e.g., ivy leaves, branches, etc. It can be made in desired shapes to fit the peripheral configuration of base member 22, i.e., if the base member is square, as illustrated, the "cake cover" will have a square configuration, and if the base member is round the "cake cover" will have a round configuration. The polyethylene covering film 52 has a small circular aperture 54 at its central point which can be reinforced by integral beading if desired. The film covering 52 is stretched over a group of bent support ribs 56, its lower edge 58 being fastened to the foot ends of each rib by small plastic cups 60 slipped over the rib tips and cemented or otherwise secured at appropriate locations along the lower peripheral edge of the covering.

The upper ends 62 of each of the ribs 56, which in a square cover have several different lengths depending on whether they are used as corner ribs, middle side ribs or ribs forming an opening such as shown in FIGURES 1 and 2, project into bores radially formed in a plastic disc 66 which connects all ribs 56. Bores 64 may be provided with bayonet type coupling slots 68 and the upper ends of the ribs 56 provided with a bayonet pin 70 enabling an interlocking fit between the upper ends of the ribs and the plastic disc 66 in a well known manner. The upper ends can be slipped fully into the disc apertures 64 with the legs of the ribs horizontal and then the legs can be swiveled to extend in a downward disposition whereby the pin 70 is rotated into a locking slot formed inside the bore 64 of the plastic disc 66 or, alternatively, the ribs can be screw threaded on their upper ends and screwed into the disc bores 64.

An ornamental handle or knob 72 with a depending threaded stud 74 inserted down through a center hole in the plastic disc 66 is retained by a nut 76 and will serve as ornamentation and as a cover lifting handle.

Clearly shown in FIGURES 1 and 2, one side of cover 50 has two intermediate ribs 56' located between the corner ribs 56 serving to frame an entrance enabling a dog to enter the toilet whenever necessary. For such entrance, the plastic cover 52 can be split and the edges folded back around and clipped to the ribs 56' by a suitable clip, e.g., small plastic clips or clothes pins, hairpins, etc. Alternatively, as shown in FIGURE 2, an arched access opening 57 can be cut in the plastic cover, the periphery of the opening being strengthened by extra layers of polyfilm or thicker polyfilm.

Toilet unit 20' illustrated in FIGURE 2 is quite similar to the embodiment shown in FIGURE 1 excepting the fire plug post 38 is removed and in lieu of the post 38, a circular grill 80 (referred to hereinafter as the female urinal grill) has been placed on the collar 34' over the butler.

Referring to FIGURES 4, 11 and 12 and generally to FIGURE 3, base member 22 is preferably made from a suitable substantially solid plastic material such as an impact resistant polystyrene, a semi-rigid polyethylene, or the like, nonabsorbent material which can be easily cleaned. It can be made in a singe piece if desired. However, a singe piece base platform does constitute a unit of considerable size and therefore is not convenient for storage or for sales packaging. It is therefore proposed to prefabricate the base member 22 from a series of identical module pieces 24, as will be described. Even so, the complete base may be circular, rectangular (e.g., square, as illustrated), or some intermediate shape, the outer peripheral outline being immaterial to the concept of module fabrication. The outer periphery of base 22 has a rolled raised edge 84 which aids in keeping excreta on the base platform and off of the surrounding floor area. Located at spaced intervals along the upper surface of the outer periphery of base member 22 and slightly inward of the rolled edge 84 are upwardly projecting plastic pins 86 which can be molded integral wtih base modules 24. Pins 86 cooperate with apertures along the edges of refill sheets 26 and aid in maintaining such refills in place.

Base 22 is preferably made from four identical quadrant sections or modules, interlocking at adjoining edges for quick assembly and disassembly, although they can be bolted together to enable permanent assembly. The underside of each module piece 24, at the squared joinder edges 88 and 90, are formed with dependent flanges extending down to a level with the bottom of the rolled peripheral edge 84. One of the two joinder flanges, e.g., flange 88 of each module piece is formed with cutouts 92 and 93 (see FIGURE 12) located at several locations along its length, leaving between each pair of cutouts a male interlock pin 94. The other module joinder flange 90 has a laterally protruding lip 96 in which is a slotted aperture 98 to match and receive in interlocking relationship the male interlock pin 94 on the other joinder flange 88 of an adjacent module piece 24. Such configuration renders the module pieces conducive to mass production. The module theme if desired can be used with only three different shaped basic pieces, center, side and corner, to fabricate platforms of larger sizes.

As shown in FIGURE 11, four identical module pieces 24 are assembled as a large flat base platform with the male joinder flanges 88 of each module interlocked with the female joinder flanges 90 of adjacent module pieces. This interlock arrangement is sufficient for a temporary assembly of a four module base member 22. For a more permanent installation, suitable holes 100 and 102, drilled in base flanges 88 and 90 of module pieces 24, enable rigid fastening by bolts 104 and nuts 106. When the base platform is upright and resting on the floor the underneath edge flanges 88 and 90 and the bottoms of the rolled edges 84 provide support structure which keeps base member 22 from sagging and maintains its upper surface essentially level. Should there be need for additional support on the underside, bracing members or rib depressions can be molded in the center portions of each module piece 24 and are well known expedients to acquire structural strength.

FIGURES 3 and 5 illustrate a disposable refill unit 26. Refill 26 has a plurality of edge apertures 110 located a predetermined distance apart corresponding to disposition of the locator pins 86 around the rolled edge 84 of base member 22. Pins 86 cooperate with apertures 110 and hold the refill unit 26 flat and located properly on the upper surface of base member 22. The sheet material refills receive the solid excreta from animals which in healthy dogs is normally dry. Most of the animals urine will be collected and drained from the post and urine collar 32 into the urine butler pan 28 but urine which misses the post goes on the refill unit and splashes from the post will also fall on the refill unit. Accordingly, the refill 26 is made of an absorbent fibrous (paper) material 112 similar to paper towels in thin sheet form with a thin laminate film of nonabsorbent polyethylene lining or coating 114 on its undersurface to prevent penetration of liquids through the refill. This serves to prevent soiling of the base platform and of the owners hands when the refill unit and products of waste on that unit are removed for disposal. The refill unit 26, if desired, can be impregnated with evergreen odor as an added inducement to dogs.

Such refill units are thin and can be folded, and packaged in lots of any desirable number and sold as dog toilet refills in packages in the same manner as garbage disposal bags are now sold.

Shown in FIGURES 6 and 7 and also in FIGURE 3, the urine butler 28 consists of a bottom pan 30 and its top 32. The bottom 30 is a flat shallow pan with an inset or stepped upper rim 120 and a radially projected handle 122 which can be contoured on its lower surface but is preferably flat on its upper surface 124. The butler lid or top 32 is depressed with a downward slope at 126 to a small center hole 218 permitting urine flowing onto the top to flow under the influence of gravity to the center of the top and thence into the butler bottom pan 30. Top 32 fits smoothly and snugly over the inset rim 120 of pan 30 and has a handle member 130 with a flat bottom surface 132 to match the flat top surface 126 of lower handle 122. The two handle parts 122 and 130, when lid 32 is on the pan 30, constitute a single handle, permitting the butler to be easily picked up and carried without spillage to be submerged in the water in a commode in the house for rinsing and flushing away of the butler contents. A deodorizing and sanitary pellet, which can be some form of lime or neutralizing alkaline material can be inserted into the butler and replaced at convenient intervals to counteract the ammonia in the urine.

As has been previously briefly described, and as apparent from FIGURE 3, butler 28 will normally be placed in the center of base platform 22. Urine collar 34 is then placed over and completely covers the butler 28 excepting for the inner portion of the butler cover 32. Shown in FIGURE 9, the underside of the urine collar 34 has an inner depending discontinuous flange formed of four quadrants 134a, 134b, 134c and 134d which, for convenience can be referred to as the inner base flange 134. The various quadrants of flange 134 are spaced apart a sufficient distance to enable overlying and confining the combination handle units 122 and 130 of butler pan 28 as clearly shown by the phantom lines of butler 28 in FIGURE 9.

The inner periphery 36 of the flow tray of urine collar 34 is located radially inward from the inner base flange 134 on the underside of the urine collar 34 and forms an overhanging lip encircling and disposed slightly inward of the outer peripheral edge of the butler top 32. Underneath the urine collar 34 there is also an outer peripheral depending annular flange 136. Both of flanges 134 and 136 are integral molded parts of the urine collar 34 and depend down to the same level to form solid collar support structure. The outer peripheral flange 136 completely encircles the butler pan when the urine collar is placed over the pan, and the inner quadrant flange 134 closely but freely encircles the cover, prevents jogging or dislodgement of such cover and locates the butler pan centrally of the overhanging directing flow lip 36 of the upper surface of the urine collecting collar 34.

The upper surface 140 of urine collar 34 has an inverted frusto-conical shape so that any urine which flows on and is collected on the collar surface 140 tends to flow inward toward the peripheral flow lip 36 and thence to the sloping top surface 126 of and into the butler pan 28.

Urine collar 34 includes several sturdy upright projections 142 surrounding and slightly spaced from the inner lip 36. Projections 142 are used to locate and stabilize the urine post 38 (FIGURE 3) placed on top of the urine collar 34. Four such projections 142 are illustrated in FIGURE 8 and while more or less such projections can be utilized as desired, it is preferable that at least 3 projections be provided to assure stabilization and centering of post 38 exactly on the center of the collar. Each projection 142 can have a center hole or depression 144 for the purpose of receiving a training liquid, such as concentrated animal urine, which attracts dogs. When post 38 is positioned over projections 142, the depressions or holes 144 will not be accessible from exterior.

The female urine grill 80 (FIGURES 10 and 2) fits on top of the urine collar 34, and is used in lieu of the urine post 38 for female dogs which can squat on the grill. FIGURE 10 shows the underside of the grill 80 which has an outer peripheral reinforcing ring 148, a cross grid of molded plastic or wire mesh 150, and an inwardly located reinforcing ring 152. The inner ring 152 is substantially the same diameter as that of post 38 and the inner periphery of ring 152 will overhang the upstanding projections 142 on top of the urine collar to centrally locate and maintaining the grill 80 in position on the urine collar 34.

For purposes of lifting the grill conveniently one or more integral lifting tabs 154 are provided on and project laterally from the outer periphery of the grill. The grill 80 is preferably made of some non-corrosive material such as integrally molded plastic, or nickel steel or some other stainless steel to provide long life. It can be an accessory or an integral part of the complete assembly, as desired.

Urine post 38 is made from a nonporous material, preferably plastic, and can be molded in cylinder form having an interior partition wall 156 adjacent the lower end. Its exterior can be made to simulate a desired object as a fire plug, tree, fence or lamp post. The inner diameter of the cylindrical post 38 is made to enable a close snug fit around the upstanding projections 142 on the urine collar 34. Projections 142 extend up to and may meet the partition wall 156 but should not be of greater length. The lower end of the hollow post 38 is made with a plurality of short legs 158 with spaces 160 therebetween. There are more legs 158 than there are upstanding projections 142 and therefore the spaces between such legs 158 constitute flow passages enabling urine flowing down the post and the upper conical surface 140 of the urine collar to pass under the lower end of post 38, between the upstanding collar projections 142, over the flow lip of collar opening 36 and thence into the butler 28.

The upper end 162 of post 38 can be shaped as the head of a fire plug, the head 162 being cemented to the upper end of post 38 if desired. In any case an upper plug unit 164 can be coupled by screw threads, lugs or other coupling devices into the upper end of the post or head end 162 and a wire handle 166 can be secured to the plug 164. The plug is rendered easily removable to enable placing of sand 168 in the post 38 for weight purposes and its handle 166 provides a means for easily lifting the entire post 38 for removal and cleaning purposes.

While base platform 22, refill sheet 26, urine butler 28, urine collar 34, and hollow post 38 constitute the primary units of the overall inventive combination, it is understood that subcombinations of these units can be utilized independently of the other units and with or without the auxiliary items and will still reside within the scope and confines of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An animal toilet combination comprising: a large flat base platform; a urine collecting butler means positioned on said platform having a top opening; a urine collecting collar means located and disposed over said butler means and having a large central opening the edge of which constitutes a liquid directing lip overhanging the top of said butler means; an animal relief device centrally located on the upper side of and covering said central opening in said collecting collar means; and means enabling drainage through said relief device to enable fluid flow from said relief device to said collar means and from said collar means to the interior of said butler means.

2. An animal toilet as defined in claim 1, wherein said platform is made from substantially rigid plastic.

3. An animal toilet as defined in claim 2, wherein said platform consists of a plurality of flat module pieces with side edges and means on side edges of said module pieces providing interlocking of adjacent module pieces.

4. An animal toilet as defined in claim 1 wherein a sheet form disposable refill unit of absorbent material is on said platform under said butler means and substantially covers said platform, said sheet form refill unit is laminated and comprises a backing layer which is impermeable to urine and an upper surface layer of fibrous absorbent material.

5. An animal toilet as defined in claim 4, wherein the edges of said refill unit include perforations and the outer periphery of said platform has a rolled ridge with upstanding short locator pins spaced to correlate with and engage with said perforations along the edge of said refill unit to locate and maintain said refill unit in position covering said platform.

6. An animal toilet as defined in claim 1, wherein said platform consists of a plurality of flat module pieces, each module piece including depending flanged edges serving as support members, providing structural rigidity and enabling maintaining of a level condition of the base in contact with a flat support such as a floor.

7. An animal toilet as defined in claim 6, wherein each module piece has side edges and includes male and female interlocking portions on said side edges to enable level interlocking of a plurality of module pieces into a single unit platform.

8. An animal toilet as defined in claim 1 wherein said butler means comprises: a flat pan; a pan cover snugly fitted on said pan; said pan cover having substantially its entire upper surface depressed and including a small aperture at the low point of said upper surface; and handles on said pan and said lid.

9. An animal toilet as defined in claim 1, wherein said relief device is a circular grill means made from non-corrosive material, and means on said grill means and on said collar means to centrally locate and to maintain said grill means on said collar means.

10. An animal toilet as defined in claim 1, wherein said relief device is a substantially cylindrical post means made from non-corrosive material, and means partially on said post means and partially on said collar means centrally locate and tend to maintain said post means on said collar means.

11. An animal toilet as defined in claim 10, wherein said post means is hollow, and includes a removable top; and said post means has a bottom wall partition enabling added material to be placed in said post means as added weight to keep said post means in position on said urine collecting collar.

12. An animal toilet as defined in claim 11, wherein said post means includes handle means for convenience in moving and cleaning said post means.

13. An animal toilet as defined in claim 10, further including a disposable, replaceable thin film plastic sleeve, one end of which is at least smaller than the cross-sectional shape of said post means and said sleeve having sufficient length and internal dimension to fit over said post means and extend to within a short distance of said collar means.

14. An animal toilet as defined in claim 1, wherein said butler means is a small flat covered pan with an apertured depression in its cover; said collecting collar means has a wide brim sloping inward and downwardly, terminated in a large opening at an inner perimeter, said inner perimeter being smaller than the plan configuration of said butler pan and providing a flow lip overhanging the perimeter of said butler pan cover; and support means on the underside of said brim to engage said platform, support said collar means and embrace said butler means to locate said collar means relative to said butler means.

15. An animal toilet as defined in claim 14, wherein a plurality of integral post means are spaced around the inner perimeter of the brim of said collar means and project up from said brim providing means cooperating with and locating and maintaining said relief device in position on said collar means.

16. An animal toilet as defined in claim 14, further including a disposable replaceable thin film plastic disc having an outer periphery similar to that of said brim and an inner periphery made to closely encircle but be spaced from said inner brim perimeter, and a short depending circular integral thin film plastic skirt around the outer periphery of said disc.

17. An animal toilet as defined in claim 1, further comprising: a removable cover unit disposed over and spaced above said platform, said refill unit, said butler means, said collecting collar means and said relief device; said cover unit comprising a plurality of wire brace means constituting support beams and legs, means securing all brace means so that said wire brace support beams radiate from a central location above said platform and so that said legs depend from said support beams and straddle said platform, a plastic film cover fitted over said support beams and depending outside of said legs, and connectors on said cover unit cooperating with said legs to maintain said cover in position.

18. An animal toilet combination comprising: a urine collecting butler means having a top opening; a urine collecting collar means located and disposed over said butler means and having a large central opening the peripheral edge portion of which constitutes a liquid directing lip overhanging the top of said butler means; an animal relief device centrally located on the upper side of said collecting collar means and covering said central opening in said collecting collar means; and means enabling drainage through said relief device to thereby permit fluid flow from said relief device to said collar means and from said collar means to the interior of said butler means.

19. An animal toilet combination comprising: a large flat plastic base means with a substantially rectangular periphery and a flat laminated sheet form disposable refill unit on and substantially covering said flat base means; said refill unit having a substantially rectangular shape which is substantially the same size as said substantially rectangular base means and comprising a thin sheet of absorbent material with a film coating on one side providing a backing adapted to rest on an upper surface of said base means, said coating being impermeable to urine, and perforations through said refill sheet adjacent and along all edges of said refill sheet, the said perforations along each edge of and relative to the associated corners of said refill sheet having a predetermined spaced apart disposition; and said flat base means, closely adjacent its outer periphery, having upstanding short locator pins spaced along each edge of said flat base means to correlate with perforations in said refill sheet and releasably engage with said refill sheet through such perforations to locate and maintain said refill sheet in position covering said flat base means.

References Cited

UNITED STATES PATENTS

| | | | |
|---|---|---|---|
| 1,773,141 | 8/1930 | Hodgson | 119—15 |
| 1,970,754 | 8/1934 | Jonasen | 5—91 |
| 2,144,329 | 1/1939 | Conlon et al. | 119—1 |
| 2,230,861 | 2/1941 | Buehler | 119—1 |
| 2,316,105 | 4/1943 | Rolder | 4—242 |
| 2,671,427 | 3/1954 | Fell | 119—1 |
| 2,871,619 | 2/1959 | Walters | 46—19 |
| 3,192,927 | 7/1965 | Chauviere | 128—287 |

FOREIGN PATENTS 227,085    8/1943    Switzerland.

SAMUEL KOREN, *Primary Examiner.*

HUGH R. CHAMBLEE, *Examiner.*